June 11, 1968     G. R. STEPANEK ET AL     3,387,881

COLLAPSIBLE ARM REST

Filed Sept. 6, 1966     2 Sheets-Sheet 1

INVENTORS
GEORGE R. STEPANEK
WILLIAM H. TERRELL
BY
Hamilton & Cook
ATTORNEYS

June 11, 1968   G. R. STEPANEK ET AL   3,387,881
COLLAPSIBLE ARM REST
Filed Sept. 6, 1966   2 Sheets-Sheet 2
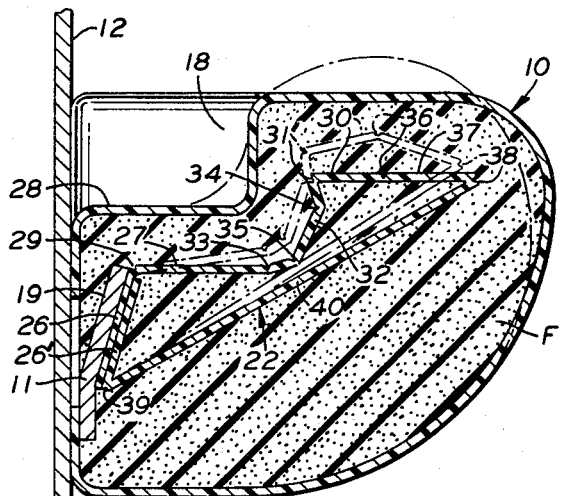
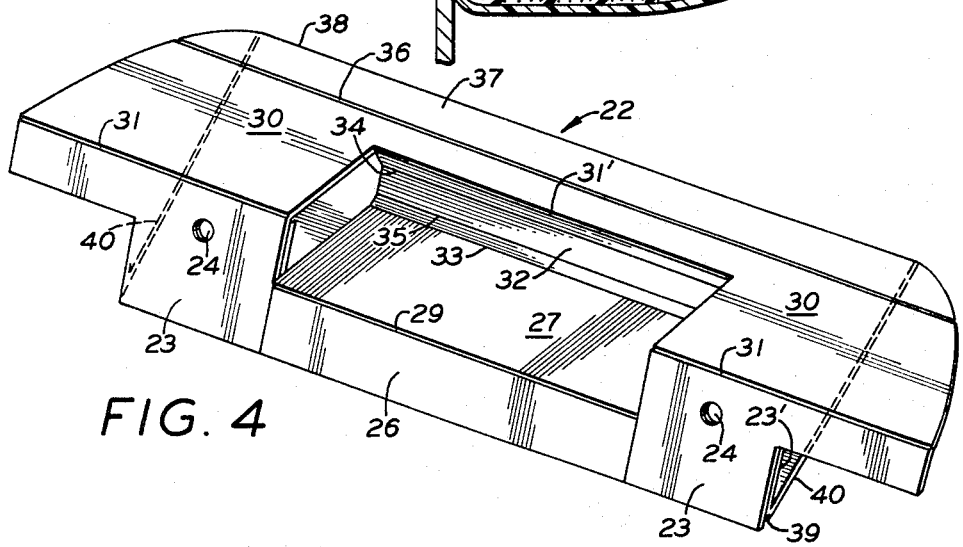
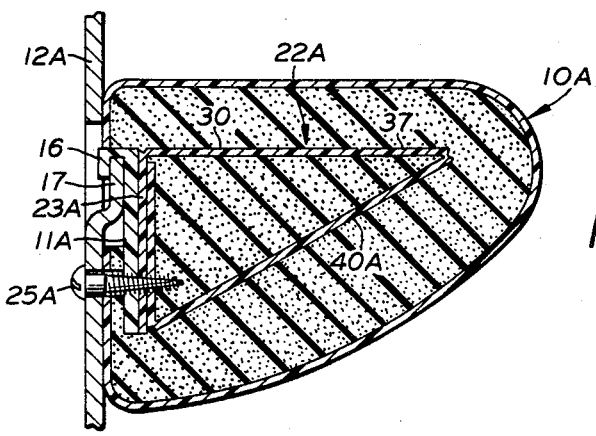
INVENTORS
GEORGE R. STEPANEK
BY WILLIAM H. TERRELL
*Hamilton & Cook*
ATTORNEYS 3,387,881
COLLAPSIBLE ARM REST
George R. Stepanek and William H. Terrell, Akron, Ohio,
assignors to Sun Corporation, Barberton, Ohio, a corporation of Ohio
Filed Sept. 6, 1966, Ser. No. 577,457
6 Claims. (Cl. 296—153)

ABSTRACT OF THE DISCLOSURE

A padded arm rest for automobiles and vehicles having a side attaching plate and a substantially flat top supporting surface, there being a foldable semi-rigid insert connected to said attaching plate and adapted to collapse when a lateral force is applied toward said attaching plate.

---

Safety arm rests for automobiles having an outer covering or skin filled with soft yielding foam or sponge material are well known. Such arm rests have a rigid interior reinforcing part which is attached to the door and which is required to give support to the soft interior when force is applied to the arm rest in a downward direction, as by the car occupant leaning on the rest.

However, in the case of an accident resulting in the car occupant being thrown sideways against the arm rest, it yields only a limited amount as permitted by the foam and the interior rigid reinforcement, and still permits injury to the side of the occupant's body if he is thrown against the arm rest with substantial force.

It is an object of the present invention to provide a novel padded arm rest which when mounted on the inside of a door will yieldingly support a substantial downward force applied to its upper surface, and will substantially collapse when a minimal amount of force is applied laterally to its side.

Another object is to provide a reinforcing insert of substantially rigid material having hinged portions adapted to fold together when a lateral force is applied to the side of the arm rest.

A further object is to provide a novel padded arm rest having an insert of plastic material having portions connected by relatively thin hinge portions in such manner as to fold in response to a lateral force and to resist folding in response to a vertical force.

A still further object is to provide an improved and inexpensive padded arm rest which is adapted to be economically made in a variety of sizes and shapes while accomplishing the foregoing objects.

These and other objects are attained by the improved constructions, materials, and combinations comprising the present invention, preferred embodiments of which are shown by way of example in the accompanying drawings and described in detail in the accompanying specification. Various modifications and changes in details of construction are intended to be within the scope of the appended claims.

Referring to the drawings:

FIG. 3 is a similar view as on line 3—3 of FIG. 1.

FIG. 4 is a perspective view of the novel insert detached from the arm rest, and not folded.

FIG. 5 is a cross-sectional view of a modified arm rest and insert.

Referring to the embodiment shown in FIGS. 1-4, inclusive, the arm rest of the invention is indicated as a whole at 10, and has an attaching plate 11 on one side for attachment with the inside of the door 12 of an automobile having a front seat 13 and steering wheel 14.

Figure 1:
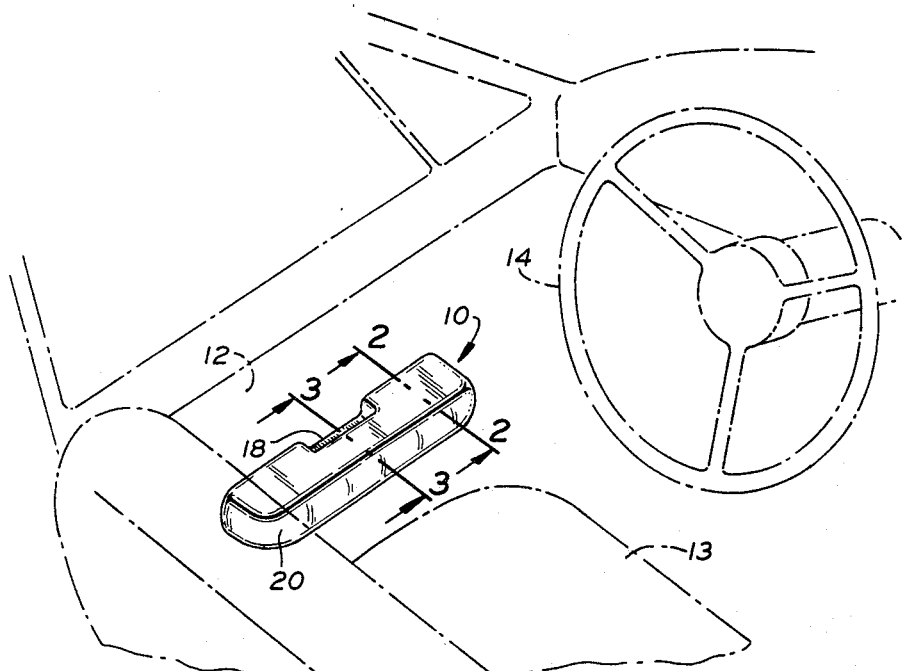
FIG. 1 is a schematic perspective view showing an embodiment of the novel arm rest mounted in position on the inside of an automobile door.
Figure 2:
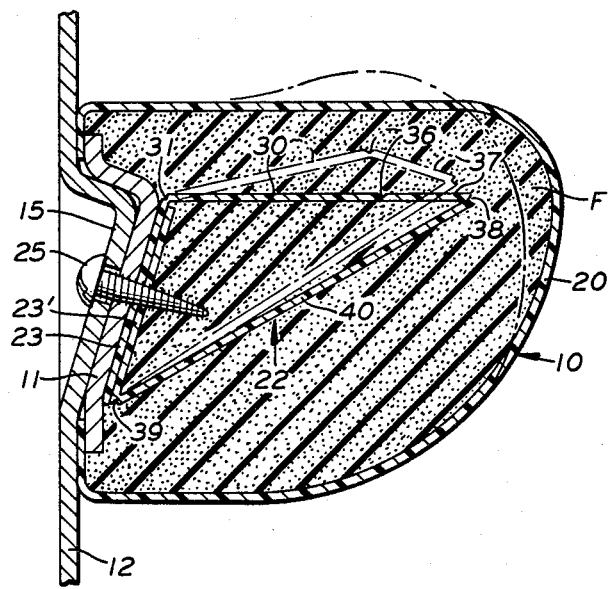
FIG. 2 is an enlarged cross-sectional view through the arm rest and attached part of the door, as on line 2—2, FIG. 1, showing in chain lines the contour of the arm rest and insert when the arm rest is subjected to lateral force as by the side of the person seated adjacent thereto.

The plate 11 may be shaped to fit a formed boss portion 15 on the door 12, as in FIG. 2, or it may be flat or shaped as at 11A in FIG. 5, having an overhanging flange 16 fitting over the top of a flange 17 formed in the door 12A.

In the embodiment of FIGS. 2 and 3, the arm rest has a central recess 18 formed therein adjacent to the door which acts as a finger hold for the passenger when going around curves or closing the door, and the attaching plate has a recessed portion to pass under the recess. The inner side and ends of the rest may be rounded as shown.

The arm rest 10 may have an ornamental skin 20 of vinyl resin plastic material surrounding a core of sponge or foam material such as polyurethane foam F. The skin may be rotationally molded or otherwise formed to shape and filled with foam with the attaching plate and insert held in place. Other suitable materials may be used for the skin and core, and the method of forming them with the insert in place may be varied within the scope of the invention.

The foldable or collapsible insert is indicated generally at 22 in FIG. 4, and may be of plastic material known as polypropylene which is substantialy rigid, or at least semi-rigid, and which has the property of forming a so-called "living hinge" where notched or grooved to provide a thin section. The term "living hinge" derives from the fact that the material can be flexed at the thin section over and over again countless times without failure. Other plastic materials such as polyethylene may be used, as well as other types of hinges, within the scope of the invention.

The insert 22 preferably has a flat inner wall which conforms to and abuts the attaching plate 11, having two end portions 23 with holes 24 receiving the screws 25 which attach the plate 11 to the door 12, and a central portion 26 conforming to and abutting the notched portion 19 of the attaching plate. A flat panel 27 positioned under the bottom wall 28 of recess 18 is hinged at its inner edge to the upper edge of portion 26, preferably by means of a "living hinge" 29.

The top wall of the insert includes a main panel having end portions 30 hinged at 31 to the ends 23 of the inner wall and having a central cutout portion hinged along its outer edge 31' to an upstanding wall 32 hinged along its bottom edge 33 to the outer edge of panel 27. As best seen in FIG. 3, the wall 32 preferably has two intermediate hinges 34 and 35 parallel to the hinges 31 and 33. The outer edge of the top main panel is hinged at 36 to an outer panel 37 which is normally in the same plane as the main panel.

The inner edge of panel 37 is hinged at 38 to the upper edge of an inclined under panel 40 hinged at its lower edge 39 to the bottom edges of inner wall portions 23' and 26' conforming to wall portions 23 and 26. While the portions 23' and 26' are shown lapped over and adhered to inner wall portions 23 and 26, respectively, it will be seen that these portions could be made narrower and folded outwardly for adherence to the attaching plate. In either case, the insert 22 can be formed from a single sheet of material. As shown, when the sheet is folded to the form shown in full lines in FIGS. 2 and 3, it has openings at its ends and at the ends of the central recess.

The insert 22 is yieldingly held in the full-line position of FIGS. 2 and 3 by the foam F which surrounds and fills the interior of the insert. In this position the insert supports the arm rests against vertical loads applied from the top in excess of 100 p.s.i. which is the minimum requirement of the automotive industry. This is due to the generally triangular form of the insert shown in full lines in FIG. 2 which resists downwardly applied vertical loads.

When a force is applied to the side of the arm rest in the direction toward the door 12, as by the passenger being thrown in that direction, the insert folds or collapses in the manner shown in chain lines in FIGS. 2 and 3, and because of the locations of the various hinge joints, the folding or collapsing action takes place when a side force of 15 p.s.i. or more is applied, which is also the minimum requirement of the automotive industry. As the side force begins to compress the arm rest to the contour shown in chain lines, the inclined panel 40 swings upwardly about the hinge 39, and the hinge 36 moves upwardly allowing the panels 30 and 37 to swing upwardly about the hinges 31 and 36, respectively. At the same time, the central portion of the top wall panel swings upwardly about hinge 31', and the several hinges 33, 34 and 35 in the upstanding recess wall 32 flatten out somewhat, allowing the bottom panel 27 of the recess to swing upwardly about hinge 29, all as shown in chain lines in FIG. 3.

In the modified form of insert shown in FIG. 5 having an arm rest 10A, the insert 22A has a generally triangular form in cross section in normal unfolded condition. However, the inside panel 23A is vertically disposed to abut the vertical attaching plate 11A secured to the door 12A by screw 25A. Otherwise, the insert 22A is substantially the same as insert 22, having an under panel 40A, and top panels 30 and 37 hinged to the panels 23A and 40A, respectively.

The improved arm rest having the novel collapsible insert as described herein provides an inexpensive arm rest which meets the requirements of the automotive industry, and which carries out the objectives of the present invention.

It will be understood that while it is preferred to use plastic material such as polypropylene as the material for the insert, with living hinges at the various connecting edges, other suitable materials may be used including sheet metal, with mechanical hinges at the connecting edges.

What is claimed is:

1. In a padded arm rest having a flexible outer plastic skin with a substantially flat top supporting surface, and an attaching plate on one side, the improvement comprising a collapsible semi-rigid insert having at least one inner portion abutting said attaching plate, an inclined panel hinged to an inner portion, a top panel hinged to an inner portion and said inclined panel and normally substantially parallel with said top supporting surface, and said top panel adapted to move inwardly when a lateral force is applied in the direction toward the inner side of the arm rest, allowing the top panel and the inclined panel to swing upwardly about said hinges.

2. The arm rest as described in claim 1 in which the material of the insert is polypropylene and the hinges thereof are linear portions of reduced thickness.

3. The arm rest as described in claim 1 in which a central recess is formed in the top wall providing a finger hold, and the insert has a horizontal panel wall under said recess, and an upstanding wall hingedly connected to said panel wall and having intermediate hinges allowing the panel wall to swing upwardly as the parts of the top panel swing upwardly.

4. The arm rest as described in claim 1 in which the top panel has an intermediate hinge parallel to said other hinges and adapted to fold when a lateral force is applied in the direction toward the inner side of the arm rest.

5. The arm rest as described in claim 2 in which the material of the insert is polypropylene and the hinges thereof are linear portions of reduced thickness.

6. The arm rest as described in claim 2 in which a central recess is formed in the top wall providing a finger hold, and the insert has a horizontal panel wall under said recess, and an upstanding wall hingedly connected to said panel wall and having intermediate hinges allowing the panel wall to swing upwardly as the parts of the top panel swing upwardly.

References Cited

UNITED STATES PATENTS

| | | | |
|---|---|---|---|
| 2,581,203 | 1/1952 | Rakas | 297—412 |
| 2,794,671 | 6/1957 | Clark | 296—153 |
| 2,922,674 | 1/1960 | Hollerbach | 296—153 |

BENJAMIN HERSH, *Primary Examiner.*

J. A. PEKAR, *Assistant Examiner.*

UNITED STATES PATENT OFFICE
CERTIFICATE OF CORRECTION

Patent No. 3,387,881                          June 11, 1968

George R. Stepanek et al.

It is certified that error appears in the above identified patent and that said Letters Patent are hereby corrected as shown below:

Column 4, lines 26 and 29, claim reference numeral "2", each occurrence, should read -- 4 --.

Signed and sealed this 10th day of March 1970.

(SEAL)
Attest:

Edward M. Fletcher, Jr.                  WILLIAM E. SCHUYLER, JR.
Attesting Officer                             Commissioner of Patents